United States Patent [19]
Kehl et al.

[11] Patent Number: 4,764,048
[45] Date of Patent: Aug. 16, 1988

[54] BALL-AND-SOCKET JOINT

[75] Inventors: Georg Kehl, Stuttgart; Ernst-Dieter Schafer, Pliezhausen, both of Fed. Rep. of Germany

[73] Assignee: Robert Bosch GmbH, Stuttgart, Fed. Rep. of Germany

[21] Appl. No.: 947,244

[22] Filed: Dec. 29, 1986

[30] Foreign Application Priority Data

Mar. 5, 1986 [DE] Fed. Rep. of Germany ....... 3607150

[51] Int. Cl.$^4$ .......................... B25G 3/00; F16C 11/00
[52] U.S. Cl. ...................................... 403/11; 403/122; 403/326
[58] Field of Search .................. 403/144, 143, 122, 11, 403/326

[56] References Cited

U.S. PATENT DOCUMENTS

| | | | |
|---|---|---|---|
| 2,010,367 | 8/1935 | Lapsley | 403/144 X |
| 3,733,966 | 5/1973 | Brown, Jr. | |
| 3,787,128 | 1/1974 | Maistrelli | 403/144 X |
| 3,862,807 | 1/1975 | Doden | 403/144 X |
| 4,435,101 | 3/1984 | Sugiyama et al. | 403/122 |

FOREIGN PATENT DOCUMENTS

| | | | |
|---|---|---|---|
| 532921 | 11/1956 | Canada | 403/122 |
| 0659600 | 4/1938 | Fed. Rep. of Germany | |
| 2224421 | 1/1974 | Fed. Rep. of Germany | 403/122 |

Primary Examiner—Andrew V. Kundrat
Attorney, Agent, or Firm—Edwin E. Greigg

[57] ABSTRACT

A lightweight ball-and-socket joint that is for instance capable of being assembled by a robot. The ball-and-socket joint has a ball head, a CIRCLIP and an outer structural part forming a socket, in which there is a circumferential groove the bottom of which forms a support face for the circlip. The support face is substantially defined by a hollow cone and surrounds the CIRCLIP like a jacket, and a flare angle of the support face opens toward the center of the ball head. The CIRCLIP presses with radial bias against the support face and therefore migrates in the direction of its largest diameter and hence toward the center of the ball head until it rests thereon.

11 Claims, 1 Drawing Sheet

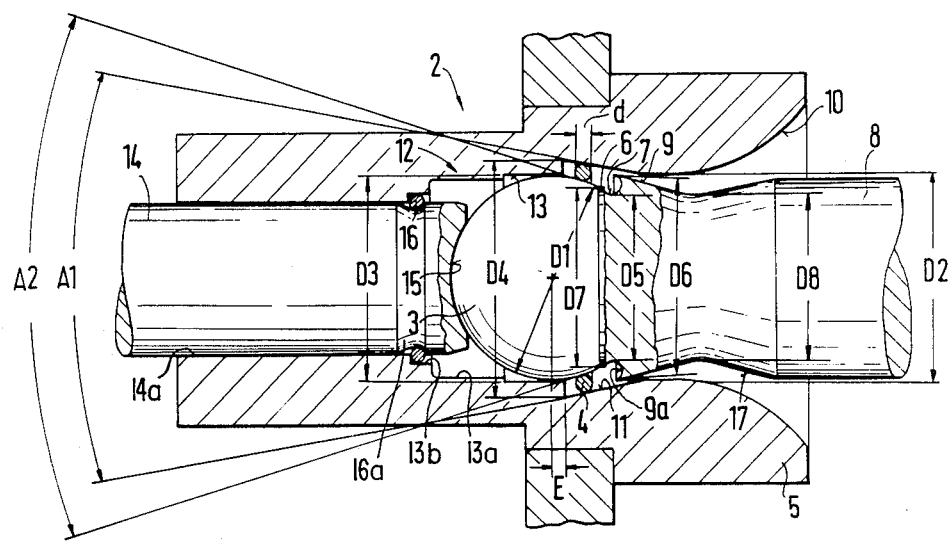

BALL-AND-SOCKET JOINT

BACKGROUND OF THE INVENTION

The present invention is based on a ball-and-socket joint as generally defined hereinafter. German patent No. 659 600 discloses a ball-and-socket joint that is self-securing during assembly and has a ball head connected via a neck with a rod, a radially elastic securing ring or CIRCLIP, and an outer structural part that pivotably receives the ball head. The structural part for the CIRCLIP has a support face in the form of a closed ring embodied by a circumferential groove. It is very difficult to manufacture the CIRCLIP with close tolerances and to position it prior to the assembly of the ball head in such a way, in a state in which it is pre-assembled in the outer part, that the ball-and-socket joint can be assembled in a trouble-free manner, for example by an automatic assembling apparatus or a robot.

OBJECT AND SUMMARY OF THE INVENTION

The ball-and-socket joint has the advantage over the prior art that despite unavoidable tolerances in the major dimensions of the CIRCLIP, it can be assembled in a trouble-free and economical manner by using a robot.

According to the invention, the ball head is secured in a form-fitting manner in the outer structural part. This has the advantage that disassembly of the ball-and-socket joint is possible only if at least one of its structural parts is destroyed. In a desirable manner, improper destruction and re-assembly is accordingly immediately apparent.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows an exemplary embodiment of the ball-and-socket joint according to the invention in a longitudinal and partially sectional view.

DESCRIPTION OF THE PREFERRED EMBODIMENT

The ball-and-socket joint 2 shown has a ball head 3, a securing ring or CIRCLIP 4 and an outer structural part 5 that receives the hall head 3 and the CIRCLIP 4. A CIRCLIP is a spring steel ring which is cut across its diameter so that the ring will expand to a larger diameter with a spacing between the cut ends.

Contiguous with the ball head 3 are a substantially cylindrical extension 6, a neck 7 that is thinner than the extension 6, a shoulder 9 and adjoining the shoulder a rod 8. A transition between the neck 7 and the shoulder 9 is formed in the manner of a throat 9a.

The outer structural part 5 has a guide bore 10 flared like the bell of a trumpet, a support face 11 and a ball socket 12. In the example shown, the ball socket 12 comprises an enlarged cylindrical receiving bore 13 which has a diameter substantially the same as the ball 3, disposed in the outer structural part 5 in the extension of the guide bore 10, and a rod-like insert 14 having a concavely shaped end face 15 that extends through a bore 14a. It will also be noted that the cylindrical bore 13 merges with a bore 13a of lesser diameter and that a further bore 13b also of still lesser diameter and of shorter length is adapted to receive a wire ring 16, this ring being received in an annulus 16a of rod 14.

The ball head 3 has a diameter D1. The guide bore 10 narrows down to a diameter D2, which is slightly larger than the diameter D1, so that the ball head 3 can be pushed longitudinally through it. The receiving bore 13 has a diameter D3, which again is slightly larger than the diameter D1, so that the ball head 3 is movable within the receiving bore 13. The concave end face 15 has a radius of curvature that is preferably as large as half the diameter D1. The CIRCLIP 4 is made of a piece of spring steel wire, which has the diameter d. The neck 7 has a diameter D5, which is smaller by at least twice the wire diameter d than the diameter D2 of the guide bore 10. The shoulder 9 adjoining the neck 7 in the direction of the rod 8 has a diameter D6, which is at most as large as the diameter D2. The inside diameter of the CIRCLIP 4, in its original state, is smaller than the diameter D6 of the shoulder 9. As a result, it is possible for the CIRCLIP 4 to rest about the neck 7 in the throat 9a next to the shoulder 9, and upon insertion of the ball head 3 into the structural part 5 to be moved through the guide bore 10 by means of the shoulder 9 and finally to be oriented toward the support face 11.

The support face 11 is embodied by a substantially conically widening bore section that is contiguous with the guide bore 10 and widens toward the middle of the ball head 3. The support face 11 has its largest diameter D4 where it borders on the receiving bore 13. An imaginary reference plane in which the diameter D4 is located is spaced apart for instance by a distance E in the direction toward the rod 8 from the middle of the ball head 3. That is to say, the distance E is measured toward the rod 8 beginning at a plane passing through the center of the ball head 3 at right angles to the longitudinal axis of the rod 8. In the non-installed state, the CIRCLIP 4 has an outer diameter that is, for instance as large as the diameter D4. As a result, the CIRCLIP 4 presses radially outward against the support face 11 when it is pushed through the guide bore 10 by the shoulder 9 in the direction of the support face 11. With its jacket face, the conical support face forms a flare angle A1 selected such that the CIRCLIP 4, because of its radial bias, is capable of sliding in the direction of the largest diameter D4 of the support face 11. The flare angle A1 must accordingly be selected such that it is at least twice the size of a friction angle formed between the CIRCLIP 4 and the support face 11 when the CIRCLIP 4 is displaced. With automatic displacement, the CIRCLIP 4 rests on the ball head 3.

As soon as the CIRCLIP 4 rests on the support face 11 and on the ball head 3, there is a curved line of contact between the CIRCLIP 4 and the ball head 3. An imaginary conical jacket of contact, which is tangent to the ball head 3 along the line of contact, has an included angle A2. Beginning at the diameter D1 of the ball head 3, the diameter d of the CIRCLIP 4, the diameter D4 and the distance E between its reference plane and the center point of the ball head 3 are selected such that the included angle A2 is larger, by at most twice the above-mentioned friction angle, than the flare angle A1. As a result, the contour of the support face 11 can be readily constructed, if the friction angle ascertained for instance by trial and error is used as the basis and if for a predetermined diameter D1 of the ball head, the diameter d of the wire cross section of the CIRCLIP 4 is selected beforehand. In the example shown, the diameter d is approximately 12% of the diameter D1.

During operation of the assembled ball-and-socket joint, pressure forces acting upon the rod 8 from outside are transmitted via the neck 7 to the ball head 3. The ball head 3, in turn, presses against the concave end face 15 of the rod-like insert 14, which is supported on the outer structural part 5, for instance via a wire ring 16. As already mentioned the CIRCLIP 4 is capable of migrating inside the substantially conically defined support face 11 in the direction of its large diameter D4 and pressing against the ball head 3 without play. Now if tensile forces are acting upon the rod 8, instead of pressure forces, then the ball head 3 presses the CIRCLIP 4 against the support face 11. Because of the size, selected as described above, of the flare angle A1 and the included angle A2, a friction-caused jamming of the CIRCLIP 4 occurs along the support face 11, so that the ball head 3, depending on its permissible deformability, moves only insignificantly away from the concave end face 15 and then returns again once the load has disappeared. As a result, the ball head 3 is secured practically without play relative to the ball socket 12.

It cannot be precluded that the aforementioned and empirically ascertained friction angle may vary during operation of the ball-and-socket joint 2 and thereby become smaller. Nor can it be precluded that while tensile forces are acting on the rod 8 the rod and hence the ball head may execute pivoting movements relative to the outer structural part 5. Both a friction angle that has become smaller and the pivoting movements of the ball head 3 can result in a relative movement of the CIRCLIP 4 with respect to the support face 11, causing the CIRCLIP 4 to migrate or tilt in the direction of the guide bore 10. In such a case, the CIRCLIP 4 or only a portion of the CIRCLIP 4 approaches the extension 5 and presses against it. The extension 6 has a diameter D7, which is larger than the diameter D2 minus twice the size of the diameter d. As a result, the outer diameter of the CIRCLIP 4 cannot be elastically reduced to such an extent that the CIRCLIP 4 could escape through the guide bore 10 having the diameter D2. The extension 6, together with the CIRCLIP 4 and the support face 11, brings about a form-fitting provision for preventing the ball head 3 from being pulled out of the structural part 5. To enable pivoting movements of a desired magnitude, the relatively thick rod 8 has a restriction 17, having a minimum diameter D8, in the vicinity of the guide bore 10.

As already noted, the CIRCLIP 4 is wrapped about the neck 7, next to the shoulder 9, before the ball head 3 is inserted into the structural part 5. As a result, the rod 8 serves as an assembling tool for installing the CIRCLIP 4 in the structural part 5. This has the advantage that for installing the ball head 3 in the structural part 5, all that is necessary is to align this ball head 3 approximately with the guide bore 10 and then to insert it. The installation of the CIRCLIP 4 and its final alignment with respect to the ball head 3 then take place without further action being taken. Easy assembly using an automatic assembling machine or a robot is thereby possible.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A ball-and-socket joint having a ball head (3) firmly joined to a rod (8), having a radially elastic CIRCLIP (4) which resets on the ball head in a region between the center of the ball head and the rod, an outer structural part (5) including a guide bore (10) that pivotably receives the ball head in the manner of a socket and has a support face (11) widening in substantially conical fashion in a direction of a center of the ball head, the CIRCLIP being supported on the support face in a securing state, said outer structural part having an inner surface having a flare angle (A1) of said support face (11), which surrounds the CIRCLIP (4), the flare angle is equal to at least twice the size of a friction angle between this support face (11) and the CIRCLIP (4), said CIRCLIP (4), in its relaxed position prior to installation in the outer structural part (5), has a diameter such that in the installed state it rests with radially outwardly acting bias on the support face (11), with an imaginary conical line of contact, which is at a tangent to the ball head (3) along a curved line of contact extending between the ball head (3) and the CIRCLIP (4), and has an included angle (A2) that is open toward the center of the ball head (3) in which the included angle is larger by twice the size of the friction angle than the flare angle (A1) of the support face (11), said guide bore of said outer structural part having a funnel like entrance end which extends to the support face (11), and a shoulder (9) is integrally formed on said rod (8), which functions as an insertion tool that is insertable through the guide bore (10) for the CIRCLIP (4) when the ball head (3) is inserted as far as the socket (12, 13, 14).

2. A ball-and-socket joint as defined by claim 1, in which immediately contiguous with the ball head (3) in the direction of the rod (8) is an extension (6), the diameter (D7) of which is larger than the smallest diameter (D2) of the support face (11) minus twice a wire diameter (d) of the circlip (4).

3. A ball joint and socket which receives a ball head (3) secured on a rod (8) which comprises an outer structure (5), said outer structure includes a bore having a smaller diameter section (14a) a larger diameter section (13) with first and second intermediate sections (13a, 13b) of different diameter, a flared entrance end (10) for receiving said ball head, said flared entrance end forms a shoulder with said larger diameter section, said larger diameter section has a diameter which is the same as the diameter of a narrowest diameter of said flared end which is slightly greater than a diameter of said ball head, said ball head (3) is integral with said rod (8), a rod shoulder (9) on said rod spaced from a center of said ball head, a neck portion 7 extending from said ball head to said rod shoulder and a throat 9a formed by a transition between said neck and said rod shoulder, a rod like insert that extends into said bore through said smaller diameter bore, said rod like insert having a coaxial concave end having the same radius on said ball head, means for securing said rod like insert in said second intermediate bore, and means for holding said ball head in said outer structure.

4. A ball joint and socket as claimed in claim 3, wherein said means for securing said ball head within said outer structure is a CIRCLIP.

5. A ball joint and socket as set forth in claim 1, wherein said rod has a reduced diameter concave section outwardly of said rod shoulder.

6. A ball joint and socket as set forth in claim 4, wherein said rod like insert includes a concave reduced diameter section which receives said means for securing said rod like insert in said outer structure.

7. A ball joint and socket as set forth in claim 5, wherein said rod like insert includes a concave reduced diameter section which receives said means for securing said rod like insert in said outer structure.

8. A ball joint and socket as set forth in claim 4, wherein said rod shoulder has the same diameter as said ball head.

9. A ball joint and socket as set forth in claim 5, wherein said rod shoulder has the same diameter as said ball head.

10. A ball joint and socket as set forth in claim 6, wherein said rod shoulder has the same diameter as said ball head.

11. A ball joint and socket as set forth in claim 7, wherein said rod shoulder has the same diameter as said ball head.

* * * * *